Patented Apr. 20, 1948

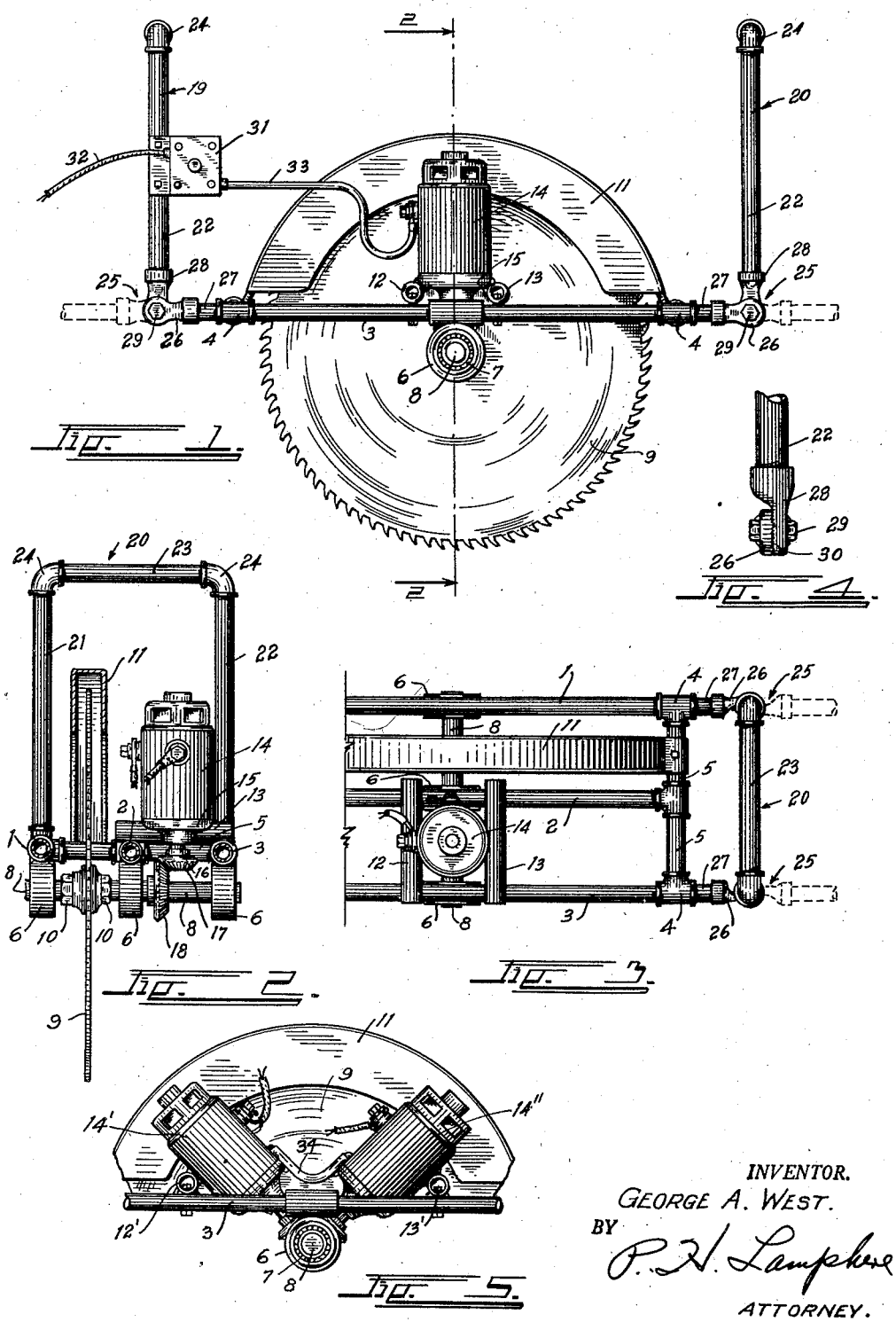

2,440,033

UNITED STATES PATENT OFFICE 2,440,033

TWO-MAN PORTABLE POWER SAW

George A. West, Guffey, Colo., assignor of forty-nine per cent to George W. Shema, Fairplay, Colo.

Application February 19, 1945, Serial No. 578,585

5 Claims. (Cl. 143—43)

This invention relates to power saws and more particularly to one which can be easily handled by two men to cut trees, logs, large pieces of wood, etc.

One of the objects of the invention is to produce an improved electric motor driven circular saw.

Another object is to so construct a power driven circular saw that it can be easily and efficiently handled by two men for a full working day without excessive tiring effort.

A further object is to so construct a saw frame and mount thereon a circular saw, together with an electric driving motor or motors and driving connection means, that there will result a compact and rigid power driven saw structure that will be light in weight and well balanced for all sawing operations.

A still further object is to provide handles for a power driven saw which can be so adjusted with respect to the saw and saw frame as to permit proper handling of the saw for making horizontal, vertical or intermediate angle cuts.

Other objects of the invention will become apparent from the following description taken in connection with the accompanying drawings in which:

Figure 1 is a side view of a power driven saw embodying my invention;

Figure 2 is a vertical section view of the saw, said view being taken on the lines 2—2 of Figure 1;

Figure 3 is a top view of part of the saw;

Figure 4 is a detail view showing one of the adjustable joints for the handles; and Figure 5 is a side view showing the manner of mounting two electric motors for driving the circular saw.

Referring to Figures 1 to 4, inclusive, in detail, the frame for the power saw comprises three tubular members 1, 2 and 3 which may be ordinary pipe. These tubular members are arranged in spaced parallel relation and lie in a single plane. The like ends of the three members are connected together by T-joints 4 and short pipe sections 5, the T-joints and short sections being arranged and connected in the manner shown. Secured to the central part of each tubular member 1, 2 and 3 are hangers 6 on which are mounted bearings 7. The hangers extend downwardly from the members and the bearings are aligned so that a single saw driving shaft 8 can be journaled therein.

Secured to the shaft and positioned between the frame members 1 and 2 is a circular saw 9, the securing means comprising clamping nuts 10. The upper portion of the circular saw is covered by a guard 11, the ends of which are mounted to the pipe sections 5 for connecting the frame members 1 and 2.

Bolted or otherwise secured to the central portions of the frame members 2 and 3 are two motor supporting rods 12 and 13 shown as tubular. These rods extend transversely to the frame members and are in parallel relation to the shaft 8 but arranged to be on opposite sides of the shaft. On these two rods is mounted the electric motor 14 for driving the circular saw. This motor is positioned so that its shaft is at right angles to the drive shaft 8 for the saw. The motor is secured to the two supporting rods 12 and 13 by having its forward end plate 15 welded thereto as best shown in Figure 1. The outer end of the motor shaft 16 has secured thereto a beveled gear 17 which is arranged to be in constant mesh with a beveled gear 18 secured to the saw driving shaft 8.

To the opposite ends of the outer tubular frame members 1 and 3 there are attached handles, generally indicated by the numerals 19 and 20. Each of these handles is of general U-shaped construction, comprising parallel tubular members or pipes 21 and 22 which are joined together at their outer ends by a cross tubular member or pipe 23, suitable elbow joints 24 being employed for making the connection between the cross tubular member and the outer ends of the parallel members 21 and 22.

The inner ends of the parallel tubular members 21 and 22 are arranged to be connected respectively to the T-joints at the ends of the frame members 1 and 3 by hinged joints 25 to permit each handle to be adjusted and locked in a plane coinciding with the plane of the frame members 1 and 3, a plane at right angles thereto or planes having angles intermediate thereof. Each of the hinged joints comprises a hinge member 26 connected to a T-joint 4 by means of a pipe nipple 27 and a cooperating hinge member 28 threaded to the lower ends of the parallel members of each handle. These hinged members are hinged together by a bolt 29 and the adjacent surface on each hinge member is provided with inter-engaging radial serrations 30 whereby the hinged members may be firmly held in any adjusted position by the clamping action of the bolt. To make an adjustment all that need be done is loosen the bolts 29 and then turn the handle to the adjusted position desired, after which the bolts are again tightened.

On one of the handles, such as 19, there is secured a switch and switch box 31 for controlling the electric current to the motor. The switch box is connected by a cable 32 to the source of electricity and by a short cable 33 comprising conductors connected to the electric motor 14. The cable 32 between the source and the switch box can be of any desired length, depending upon how far it is desired to employ the saw from the the source of current which can be portable. In practice cables have been used as long as 400 feet. Other lengths can be used as found practicable. The short cable 33 between the switch box and the motor is of sufficient length to permit free adjustment of the handle upon which the switch box is mounted.

From the foregoing description it is seen that I have constructed an electric motor power saw which is very light in weight and yet rigid in construction. The arrangement of the handles at both ends of the frame permit two men to operate the saw in an efficient manner and without any excessive tiring effort. If the saw is to be used to make a horizontal cut, as in cutting down trees, the handles 19 and 20 should preferably be placed in the positions shown in Figure 1 wherein they are at right angles to the plane of the frame members. When in this position each operator can grasp the upper member of a handle by both hands and the two can then readily manipulate the saw. Since the handles are extending from the frame members on the same side as the motor, it is readily seen that the center of gravity of the entire saw assembly will be at some point directly between the grasped member of the two handles and thus there will be proper balance for easy handling. When it is desired to make a vertical cut with the saw, the handles 19 and 20 can be adjusted downwardly to positions either in the plane of the frame members or at an acute angle thereto. The saw is then easily manipulated to make the vertical cut by each man grasping a cross member 23 of a handle.

A tree or a free piece of wood which has a thickness approximately the diameter of the circular saw, can be sawed by the power saw as the circular saw can be employed to cut half way through the tree from one side and then half way through from the other side. Some allowance must be made, of course, for the bearings on the saw driving shaft. Thus, for example, if the diameter of the saw is 36 inches it is possible to readily cut a tree which is approximately 34 inches in diameter. A saw assembly which is constructed for employing a 36 inch diameter circular saw has only a total weight of approximately 50 pounds. Thus it is seen that the saw assembly is extremely light in weight and two men can readily use the saw for a full day's work without excessive tiring. It means that each man needs to only lift 25 pounds. Different sized circular saws can be employed and when this is done the sizes of the frame and handles can be varied accordingly. However, the weight will not be appreciably increased, except for the increase in weight of the size of the circular saw.

If a single motor does not supply sufficient power to drive the saw, it is possible to employ two motors, as is indicated in Figure 5. When two motors are used the tubular cross bars 12' and 13' secured transversely to the frame members 2 and 3 are positioned a greater distance apart. The two motors 14' and 14" are then arranged in a V formation with their sides welded to the cross bars as shown. To further securely mount the motors, a connecting bar 34 is secured between the end frames of the two motors as by welding. Each of the motor shafts is provided with a beveled gear for driving the circular saw driving shaft.

This arrangement of the two motors maintains the proper balance of the saw assembly and yet does not interfere with the thickness of the wood which can be cut by the circular saw. If the motors 14 were positioned below the frame with their motor axes parallel with the frame members, then the motor frames would extend below the bearing hangers and thus decrease the available cutting diameter of the saw. With my particular arrangement of the two motors there is not this disadvantage. With the V arrangement of the motors the center of gravity will still remain on the same side as the handles when the saw is being used for horizontal cutting and thus proper balance is retained.

Being aware of the possibility of modifications in the particular saw structure described, I do not intend that the scope of the invention be limited in any manner except in accordance with the appended claims.

Having fully described my invention, what I claim as new and desire to secure by Letters Patent of the United States is:

1. In a two man portable power saw, a frame, a shaft journaled on the frame intermediate its ends and transversely of the longitudinal axis of the frame, a saw driven by the shaft, a motor mounted on the frame and connected to drive the shaft, a handle at each end of the frame and comprising a U-shaped structure, adjustable connections between the outer ends of the leg portions of each U-shaped structure and a frame end, said connections permitting the handle to be positioned so that its legs are at an angle to the longitudinal axis of the frame or in a position extending longitudinally from the end of the frame, and means for locking each handle in an adjusted position.

2. In a two man portable power saw, three parallel frame members positioned in a single plane, means connecting like ends together, a shaft journaled on one side of the frame members and positioned transversely thereto, a circular saw secured to the shaft and arranged to extend between the intermediate frame member and an outer frame member, an electric motor mounted on the intermediate frame member and the other outer frame member, said motor being positioned to have its shaft axis at right angles to the saw driving shaft axis, gearing connecting the shafts, U-shaped handles at each end of the frame members and lockable hinge joints connecting the outer ends of the leg portions of each handle and the ends of an outer frame member.

3. In a two man portable power saw, a frame having three parallel tubular frame members connected at like ends by tubular members and T-joints, a transversely positioned saw shaft journaled on the frame members intermediate their ends, a saw secured to the shaft and positioned to extend between an outer and the intermediate parallel frame members, a motor mounted on the other outer and the intermediate parallel frame members and connected to drive the saw shaft, and a U-shaped handle at each end of the frame, the outer leg ends of each handle being connected to the T-joints at the ends of the outer parallel frame members.

4. In a two man portable power saw, a frame having three parallel frame members and transverse connecting members at their ends, aligned bearing supports secured to like sides of the parallel frame members intermediate their ends, a shaft journaled in the supports and positioned transversely of the parallel frame members, a circular saw secured to the shaft and positioned to extend between an outer and the intermediate parallel frame member, an electric motor mounted on the other outer and the intermediate parallel frame members, said motor having its shaft axis at right angles to the saw shaft axis and being positioned so that its entire body lies on the frame side of a plane passing through the saw shaft axis and parallel with the parallel frame members, means for driving the saw shaft by the motor shaft, and means providing a handle at each end of the frame and comprising two hand gripping portions arranged at right angles to each other and so connected to the frame that one portion can be gripped by an operator to make a horizontal cut and the other portion can be gripped to make a vertical cut.

5. In a two man portable power saw, a frame comprising three parallel arranged rod type frame members and means for securing the like ends of the members together, a shaft journaled on the frame members at one side thereof and intermediate their ends, a circular saw element secured to the shaft so as to rotate in a plane passing between one of the outside frame members and the intermediate frame member, an electric motor positioned to have its rotor axis at right angles to the saw shaft and being mounted on the other outside frame member and the intermediate frame member and to the side of the frame members opposite that of the shaft, gear means for driving the shaft from the motor and a U-shaped handle means secured at the outer ends of its leg portions to each end of the frame so as to provide right angled gripping portions whereby there will always be presented a horizontally extending gripping portion in making either vertical or horizontal cuts with the saw.

GEORGE A. WEST.

REFERENCES CITED

The following references are of record in the file of this patent:

UNITED STATES PATENTS

| Number | Name | Date |
|---|---|---|
| 822,056 | Knox | May 29, 1906 |
| 955,975 | Longstreet | Apr. 26, 1910 |
| 1,016,664 | Bailey | Feb. 6, 1912 |
| 1,174,890 | Naylor | Mar. 7, 1916 |
| 1,231,625 | Lee | July 3, 1917 |
| 1,505,947 | Chapman | Aug. 26, 1924 |
| 1,792,204 | Wallace et al. | Feb. 10, 1931 |
| 1,796,879 | Werber | Mar. 17, 1931 |
| 1,830,579 | Wappat | Nov. 3, 1931 |
| 2,357,953 | James | Sept. 12, 1944 |